(12) United States Patent
Shirai et al.

(10) Patent No.: US 10,711,718 B2
(45) Date of Patent: Jul. 14, 2020

(54) CONTROLLER AND CONTROL METHOD FOR ENGINES

(71) Applicant: VOLVO LASTVAGNAR AB, Göteborg (SE)

(72) Inventors: Masafumi Shirai, Saitama (JP); Kunihiro Kaneko, Saitama (JP)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/106,197

(22) PCT Filed: Dec. 24, 2013

(86) PCT No.: PCT/JP2013/084516
§ 371 (c)(1),
(2) Date: Jun. 17, 2016

(87) PCT Pub. No.: WO2015/097755
PCT Pub. Date: Jul. 2, 2015

(65) Prior Publication Data
US 2016/0369725 A1    Dec. 22, 2016

(51) Int. Cl.
*F02D 41/02* (2006.01)
*F02D 17/00* (2006.01)
(Continued)

(52) U.S. Cl.
CPC .......... *F02D 41/022* (2013.01); *F02D 17/00* (2013.01); *F02D 41/042* (2013.01);
(Continued)

(58) Field of Classification Search
CPC .. F02D 41/022; F02D 41/2406; F02D 41/042; F02D 41/26; F02D 41/065;
(Continued)

(56) References Cited

U.S. PATENT DOCUMENTS 5,540,299 A * 7/1996 Tohda ................. B60K 17/356
                                                    180/243
6,202,776 B1 * 3/2001 Masberg ................. F02B 67/04
                                                    180/65.22
(Continued)

FOREIGN PATENT DOCUMENTS

CN    1796747 A    7/2006
CN    102485565 A    6/2012
(Continued)

OTHER PUBLICATIONS

International Search Report (dated Apr. 4, 2014) for corresponding International App. PCT/JP2013/084516.
(Continued)

*Primary Examiner* — David Hamaoui
(74) *Attorney, Agent, or Firm* — WRB-IP LLP

(57) ABSTRACT

A control unit decides whether or not a first condition that a service brake is released, a parking brake is actuated, and a transmission is shifted into neutral is established at a vehicle stopping time. In addition, the control unit decides whether or not a second condition that the service brake is actuated, and the transmission is shifted to an ahead stage is established at the vehicle stopping time. Then, the control unit stops the engine when the first condition or the second condition is established.

5 Claims, 8 Drawing Sheets

(51) Int. Cl.
*F02N 11/08* (2006.01)
*F02D 41/04* (2006.01)
*F02D 41/06* (2006.01)
*F02D 41/24* (2006.01)
*F02D 41/26* (2006.01)

(52) U.S. Cl.
CPC ....... *F02D 41/065* (2013.01); *F02D 41/2406* (2013.01); *F02D 41/26* (2013.01); *F02N 11/0822* (2013.01); *F02D 2200/101* (2013.01); *F02D 2200/602* (2013.01); *F02N 11/0825* (2013.01); *F02N 2200/063* (2013.01); *F02N 2200/0802* (2013.01); *F02N 2200/0803* (2013.01); *F02N 2200/102* (2013.01); *F02N 2200/103* (2013.01); *Y02T 10/48* (2013.01)

(58) Field of Classification Search
CPC ............... F02D 17/00; F02D 2200/602; F02D 2200/101; F02N 11/0825; F02N 2200/102; F02N 2200/0803; F02N 2200/103; F02N 2200/063; F02N 2200/0802; F02N 11/0822; Y02T 10/48
See application file for complete search history.

(56) References Cited

U.S. PATENT DOCUMENTS

| | | | | |
|---|---|---|---|---|
| 7,552,705 | B2* | 6/2009 | Serkh | B60K 6/28 123/179.4 |
| 8,690,731 | B1* | 4/2014 | Sangameswaran | F02N 11/0822 477/111 |
| 8,897,990 | B2* | 11/2014 | Kim | F02N 11/0833 123/179.4 |
| 8,936,531 | B2* | 1/2015 | Sangameswaran | B60W 10/06 477/901 |
| 9,067,595 | B2* | 6/2015 | Wright | B60W 10/02 |
| 2005/0234772 | A1* | 10/2005 | Haruki | G06Q 30/0231 705/14.31 |
| 2008/0217083 | A1 | 9/2008 | Serkh et al. | |
| 2011/0112740 | A1* | 5/2011 | Hashimoto | F02D 17/02 701/70 |
| 2011/0307155 | A1* | 12/2011 | Simard | F02D 11/105 701/93 |

FOREIGN PATENT DOCUMENTS

| | | |
|---|---|---|
| CN | 103026035 A | 4/2013 |
| DE | 19532135 A1 | 3/1997 |
| EP | 1077149 A2 | 2/2001 |
| EP | 1612408 A1 | 1/2006 |
| JP | 942003 A | 2/1997 |
| JP | H0942003 | 2/1997 |
| JP | 2000314332 | 11/2000 |
| JP | 2000314332 A | 11/2000 |
| JP | 2000356147 | 12/2000 |
| JP | 2000356147 A | 12/2000 |
| JP | 200112271 A | 1/2001 |
| JP | 2003120356 | 4/2003 |
| JP | 2003120356 A | 4/2003 |
| JP | 2006177173 | 7/2006 |
| JP | 2006177173 A | 7/2006 |
| JP | 2008128104 | 6/2008 |
| JP | 201247051 A | 3/2012 |
| JP | 2012047051 | 3/2012 |
| JP | 2013104385 A | 5/2013 |
| WO | 2010018900 A1 | 2/2010 |
| WO | 2012011533 A1 | 1/2012 |
| WO | 2012095993 A1 | 7/2012 |

OTHER PUBLICATIONS

Eurpean Official Action (dated Oct. 13, 2017) for corresponding European App. EP13900548.2.
Japanese Official Action (dated Oct. 3, 2017) for corresponding Japanese App. 2015-554336.
Chinese Official Action (dated Aug. 20, 2018) for corresponding Chinese App. 291330081882.2.
European Official Action (dated Jan. 28, 2019) for corresponding European App. EP 13 900 548.2.

* cited by examiner

CONTROLLER AND CONTROL METHOD FOR ENGINES

BACKGROUND AND SUMMARY

The present invention relates to controller and control method for an engine for controlling an idling reduction (an idling stop) system.

There are cases where the idling reduction system that stops the engine when a predetermined condition is established at a vehicle stopping time is loaded on recent vehicles in order to improve fuel efficiency. As one example of the condition that stops the engine, a condition that a transmission is shifted into neutral, a parking brake is actuated, and a service brake is released is applied as described in Japanese Patent Application Laid-Open Publication No. 2013-104385 (Patent Document 1). This condition is the one that a parking state that the vehicle stops for a long period of time is taken into account and is applied, in particular, to commercial vehicles in many cases.

Patent Document 1: Japanese Patent Application Laid-Open Publication No. 2013-104385

However, the state that enables the engine to stop covers not only a parking state but also a halted state where the vehicle is temporarily stopped with a traffic signal and so forth. Although there are cases where the idling reduction system that stops the engine in the halted state is loaded on passenger cars and so forth, in heavy-duty and medium trucks, it is not expected to stop the engine in the halted state. Incidentally, in the passenger cars and so forth, it is not expected to stop the engine in the parking, state.

Accordingly, it is desirable to provide controller and control method for an engine that have promoted further improvement of the fuel efficiency by stopping the engine in the halted state and the parking state.

The controller for an engine has a sensor that detects an actuating state of a service brake, a sensor that detects the actuating state of a parking, brake, a sensor that detects a gear shift state of a transmission, and a control unit that controls the engine at a vehicle stopping, time, according to output signals from the sensors. Then, the control unit stops the engine when a first condition that the service brake is released, the parking brake is actuated, and the transmission is shifted into neutral has been established, or a second condition that the service brake is actuated and the transmission is shifted to an ahead stage has been established.

According to an aspect of the present invention, since the condition that stops the engine is increased, further improvement of the fuel efficiency can be promoted.

DETAILED DESCRIPTION

In the following, an embodiment for embodying the present invention will be described in detail with reference to the appended drawings.

Figure 1:
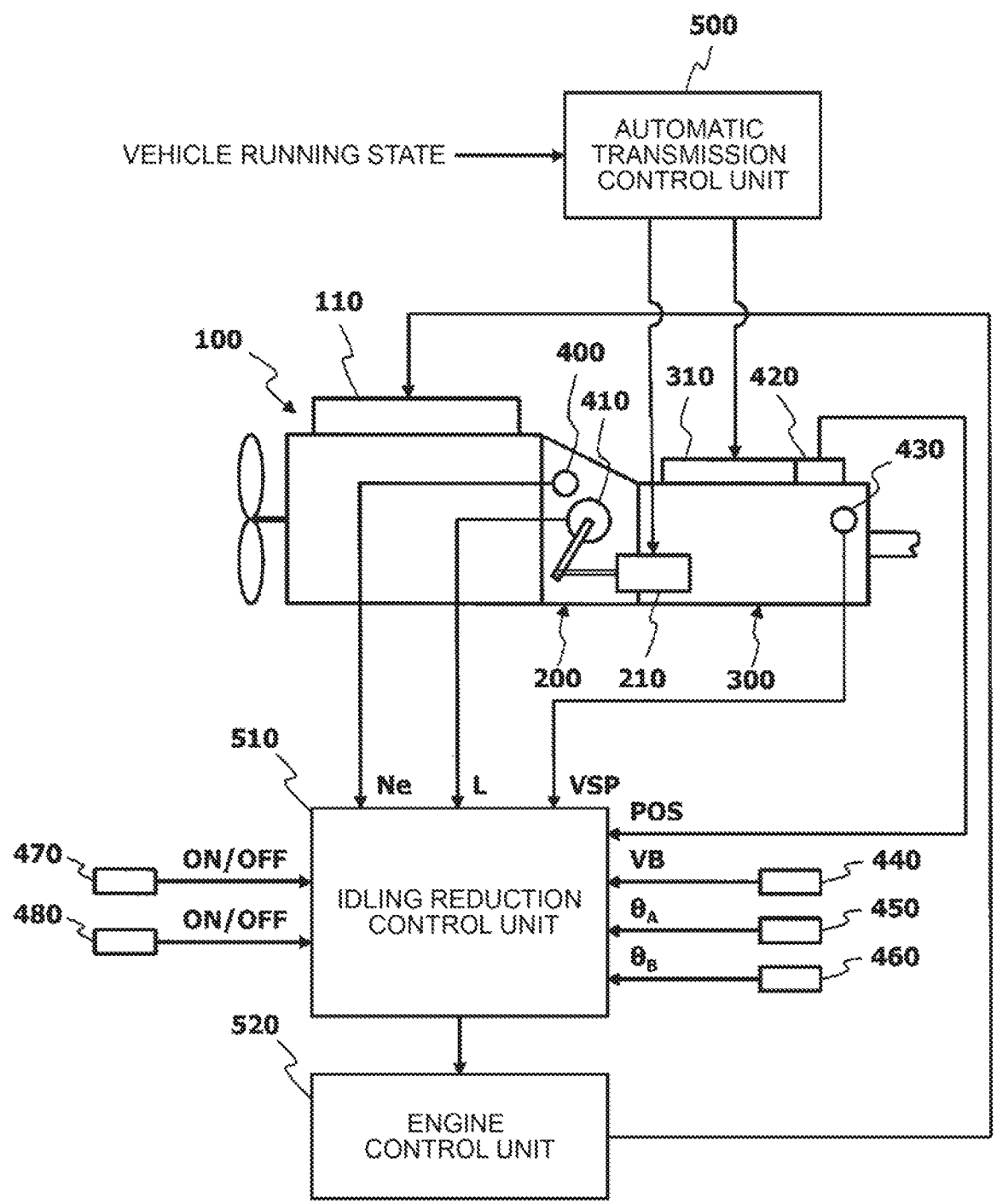
FIG. 1 is a schematic diagram illustrating one example of an idling reduction system.

FIG. 1 illustrates one example of an idling reduction system.

An input shaft of a constant mesh type transmission (hereinafter, will be abbreviated as a "transmission") 300 is coupled to an output shaft of a diesel engine 100 via a friction clutch 200.

A fuel injector 110 that injects fuel (diesel oil) into a combustion chamber is attached to a cylinder head of the diesel engine 100. As the fuel injector 110, for example, an electronic fuel injection valve that a plunger is actuated in response to input of a drive signal and the fuel is injected through a nozzle hole in a tip can be utilized. In addition, a rotational speed sensor 400 that detects an engine rotational speed Ne is attached to the output shaft of the diesel engine 100.

An output shaft of a clutch booster 210 is connected to the friction clutch 200 as one example of a clutch driving actuator. In addition, a stroke sensor 410 that detects a stroke L of the clutch booster 210 is attached to the friction clutch 200 in order to enable grasping of a connected/disconnected state. Here, as the clutch booster 210, well-known actuators such as, for example, a hydraulic cylinder that uses an oil pressure as a working fluid, an air cylinder that uses air as the working fluid and so forth can be used.

A gearshifter 310 that switches variable speed levels is attached to the transmission 300 via, for example, a synchromesh mechanism. The gearshifter 310 builds therein the well-known actuator, such as, for example, the hydraulic cylinder that uses the oil pressure as the working fluid, the air cylinder that uses air as the working fluid and so forth, and executes gear shifting while taking synchronization by the synchromesh mechanism, by moving a shifting fork by this actuator. Incidentally, as the transmission 300, well-known transmissions such as, for example, a transmission that utilizes a planetary gear, a non-stage transmission and so forth can be used, not limited to the constant mesh type transmission.

Then, an automatic transmission control unit 500 that builds therein a microcomputer electronically controls respectively the clutch booster 210 of the friction clutch 200 and the gearshifter 310 of the transmission 300 according to a running state of a vehicle and thereby implements a so-called mechanical type automatic transmission. Incidentally, since concrete details of the automatic transmission control are well known, description thereof is omitted.

In addition, a position sensor 420 that detects a gear shift stage POS that is one example of a gear shift state, and a vehicle speed sensor 430 that detects a vehicle speed VSP from a rotational speed of an output shaft are respectively attached to the transmission 300. The position sensor 420 at least detects whether or not the transmission 300 is shifted to an ahead stage and whether or not the transmission 300 is shifted into neutral as the gear shift stage POS.

Respective output signals of the rotational speed sensor 400, the stroke sensor 410, the position sensor 420 and the vehicle speed sensor 430 are input into an idling reduction control unit 510 that builds therein a microcomputer. In addition, respective output signals of a voltage sensor 440 that detects a battery voltage VB, a first opening sensor 450 that detects an opening $\theta_A$ of an accelerator pedal, and a second opening sensor 460 that detects an opening $\theta_B$ of a brake pedal are input into the idling reduction control unit 510. Further, respective output signals of a main switch 470 that allows selection of whether or not the idling reduction system is used and a parking brake switch 480 that outputs an ON signal when a parking brake is actuated are input into the idling reduction control unit 510. Here, the main switch 470 outputs an OFF signal when the idling reduction system is not used and outputs the ON signal when the idling reduction control system is used, according to an operation of a driver and others. In addition, the parking brake switch 480 outputs the OFF signal when the parking brake is released, that is, the parking brake is not actuated.

Incidentally, the rotational speed sensor 400, the stroke sensor 410, the position sensor 420 and the vehicle speed sensor 430 are respectively given as examples of a sensor that detects the rotational speed of the engine, a sensor that detects an actuation state of the clutch, a sensor that detects the gear shifted state of the transmission and a sensor that detects the vehicle speed. In addition, the voltage sensor 440, the first opening sensor 450, the second opening sensor 460 and the parking brake switch 480 are respectively given as examples of a sensor that detects the voltage of a battery, a sensor that detects an operation state of the accelerator pedal, a sensor that detects the actuation state of a service brake and a sensor that detects the actuation state of the parking brake.

Figure 2:
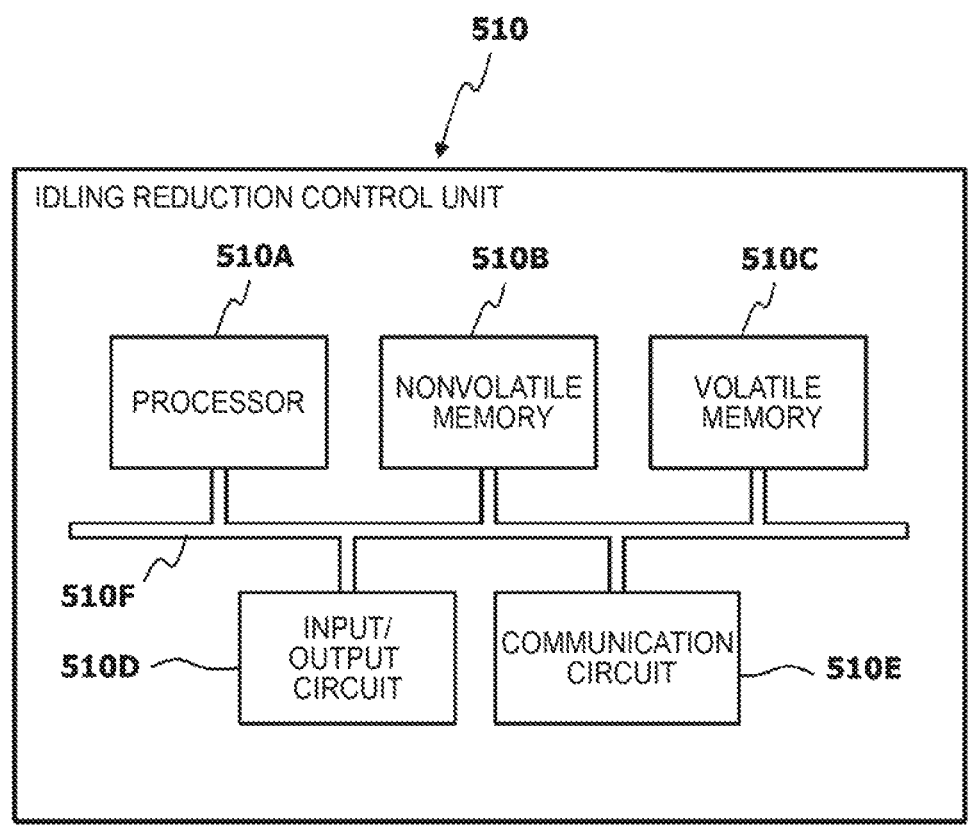
FIG. 2 is an inner structure diagram illustrating one example of an idling reduction control unit.

As illustrated in FIG. 2, the idling reduction control unit 510 has a processor 510A such as a CPU (Central Processing Unit) and so forth, and a nonvolatile memory 510B such as a flash ROM (Read Only Memory) and so forth, and a volatile memory 510C such as a RAM (Random Access Memory) and so forth, and an input/output circuit 510D adapted to connect together the sensors and the switches, and a communication circuit 510E that communicates with other control units. In addition, the processor 510A, the nonvolatile memory 510B, the volatile memory 510C, the input/output circuit 510D and the communication circuit 510E are connected via a bus 510F to be mutually communicatable. Incidentally, also the automatic transmission control unit 500 and a later described engine control unit 520 are the same as the above.

Here, the nonvolatile memory 510B stores a control program for executing idling reduction. In addition, the communication circuit 510E communicates with other control units via well-known on-vehicle networks such as, for example, CAN (Controller Area Network), FlexRay (a registered trademark) and so forth.

Then, when a predetermined engine stop condition has been established, the idling reduction control unit 510 transmits an engine stop command to the engine control unit 520 that builds therein the microcomputer and thereby causes it to stop the diesel engine 100. In addition, when a predetermined engine restart condition has been established, the idling reduction control unit 510 transmits an engine restart command to the engine control unit 520 and thereby causes it to restart the diesel engine 100. Here, the engine control unit 520 stops and restarts the diesel engine 100 by outputting a drive signal to, for example, the fuel injector 110 and a not illustrated starter, in response to the command from the idling, reduction control unit 510.

Figure 3:
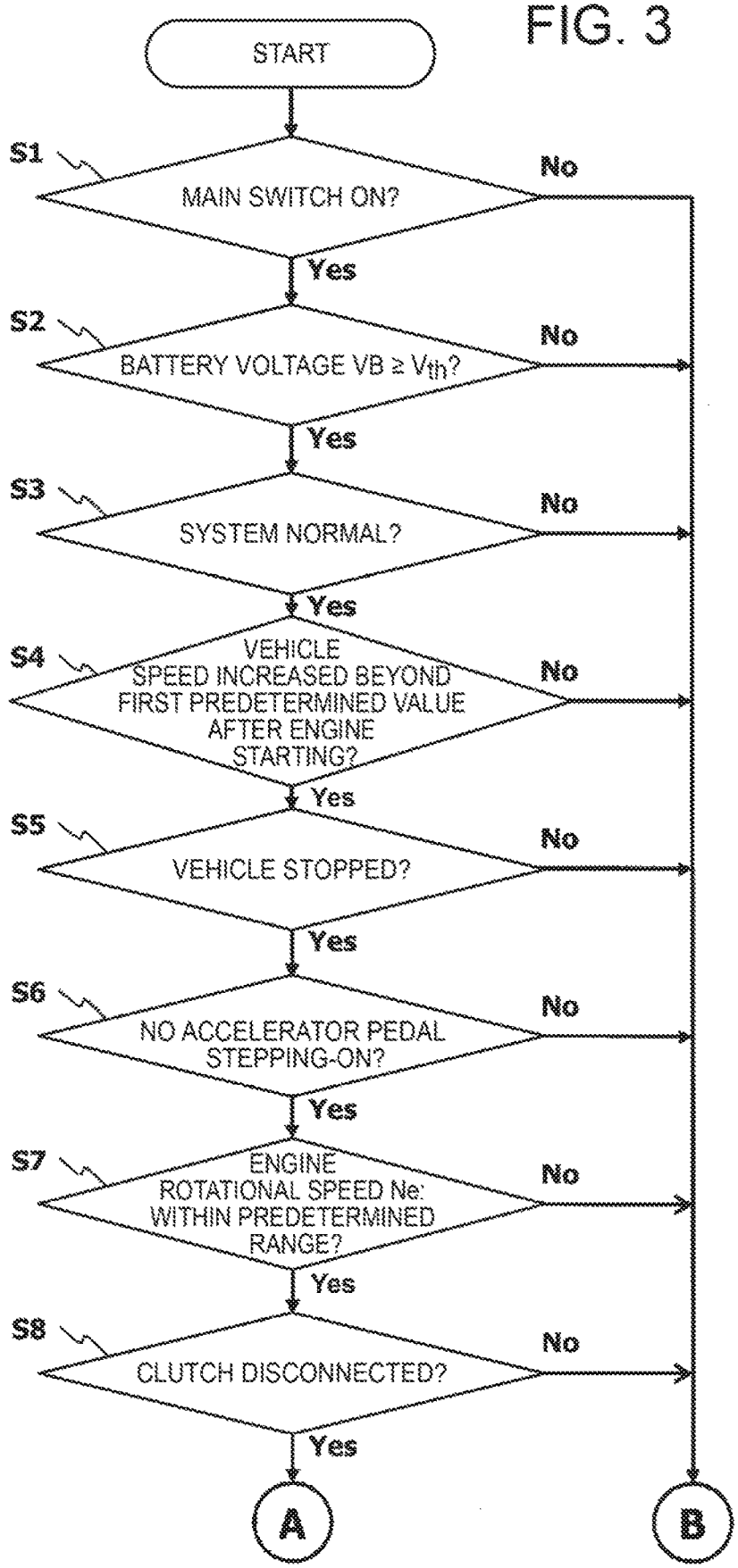
FIG. 3 is a flowchart illustrating one example of an engine stopping process.
Figure 4:
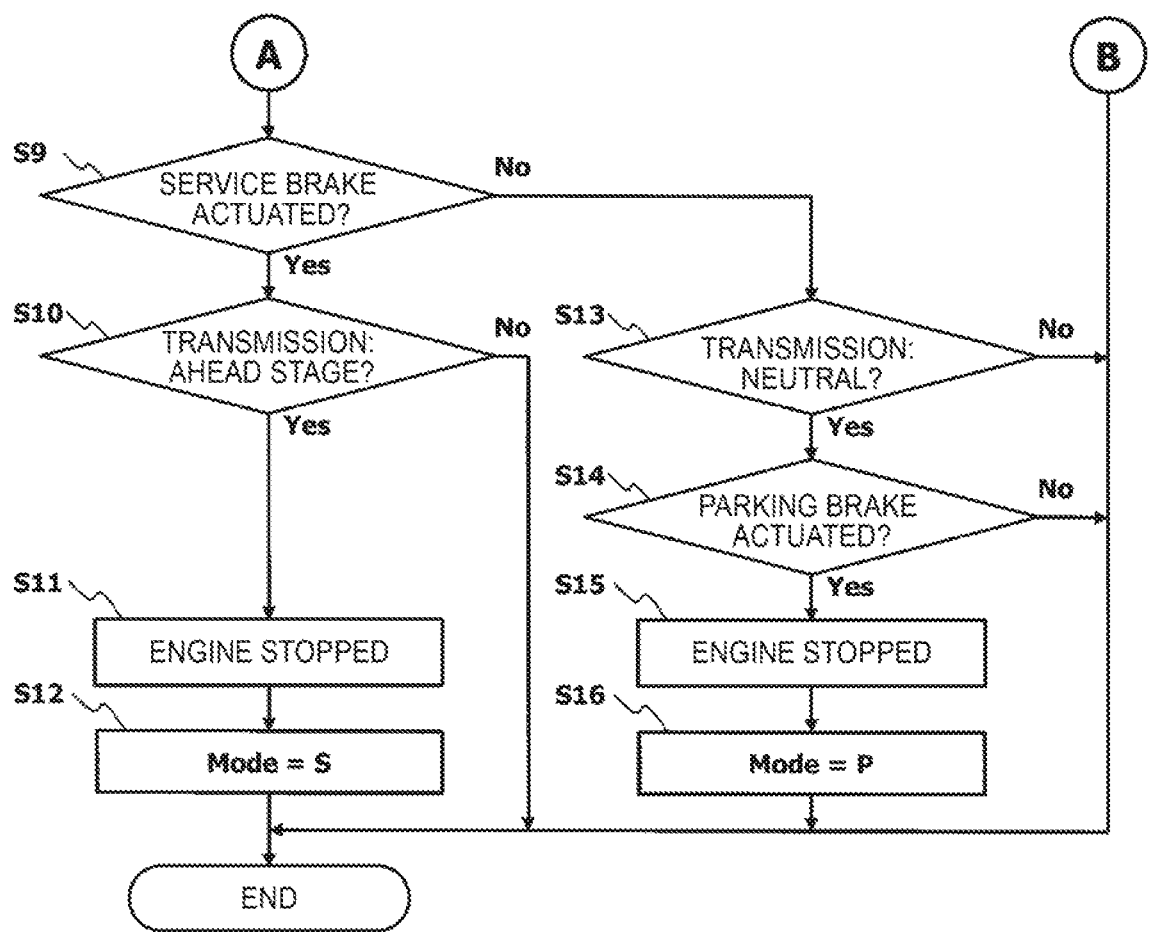
FIG. 4 is a flowchart illustrating, one example of the engine stopping process.

FIG. 3 and FIG. 4 illustrate one example of an engine stopping process that the idling reduction control unit 510 repetitively executes at intervals of a predetermined time $t_1$, with that the diesel engine 100 has been started by an ignition switch as a trigger.

In step 1 (in the drawing, will be abbreviated as "S1". The same shall apply hereinafter), the idling reduction control unit 510 reads therein the output signal of the main switch 470 and decides whether or not the main switch 470 stays ON, in short, whether or not the idling reduction system is to be used. Then, while the idling reduction control unit 510 makes the process proceed to step 2 when it decides that the main switch 470 stays ON (Yes), it terminates the process when it decides that the main switch 470 stays OFF (No).

In step 2, the idling reduction control unit 510 reads therein the output signal of the voltage sensor 440 and decides whether or not the battery voltage VB is equal to or larger than a predetermined voltage Vth. Here, the predetermined voltage Vth is a threshold value adapted for deciding whether or not the battery can afford to restart the diesel engine 100, and is appropriately set according to, for example, charging characteristics of the battery. Then, while the idling reduction control unit 510 makes the process proceed to step 3 when it decides that the battery voltage VB is equal to or larger than the predetermined voltage Vth (Yes), it terminates the process when it decides that the battery voltage VB is less than the predetermined voltage Vth (No).

In step 3, the idling reduction control unit 510 decides whether or not the idling reduction system is normal, for example, by utilizing a self-diagnosis function. Then, while the idling reduction control unit 510 makes the process proceed to step 4 when it decides that the idling reduction system is normal (Yes), it terminates the process when it decides that the idling reduction system is abnormal (No).

In step 4, the idling reduction control unit 510 reads therein the output signal of the vehicle speed sensor 430 and decides whether or not the vehicle speed VSP has been increased beyond a first predetermined value (a predetermined vehicle speed) after start of the diesel engine 100. Here, the first predetermined value is a threshold value adapted for suppressing that idling reduction is executed directly after the start of the diesel engine 100 by the ignition switch, and can take a value with which it can be thought that the vehicle has started running, by taking, for example, characteristics and so forth of the vehicle speed sensor 430 into consideration. Then, while the idling reduction control unit 510 makes the process proceed to step 5 when it decides that the vehicle speed VSP has been increased beyond the first predetermined value (Yes), it terminates the process when it decides that the vehicle speed VSP is not increased beyond the first predetermined value No).

In step 5, the idling reduction control unit 510 reads therein the output signal of the vehicle speed sensor 430 and decides whether or not the vehicle has stopped, via whether or not the vehicle speed VSP is equal to or smaller than a second predetermined value. Here, the second predetermined value can be set to a value that enables decision of a state where it can be regarded that it has stopped such as that the vehicle is running at an extremely low speed, not limited to a state where the vehicle has completely stopped. Then, while the idling reduction control unit 510 makes the process proceed to step 6 when it decides that the vehicle has stopped (Yes), it terminates the process when it decides that the vehicle does not stop (No).

In step 6, the idling reduction control unit 510 reads therein the output signal of the first opening sensor 450 and decides whether or not the accelerator pedal is stepped on, for example, via whether or not the opening $\theta_A$ of the accelerator pedal is 0. Then, while the idling reduction control unit 510 makes the process proceed to step 7 when it decides that the accelerator pedal is not stepped on (Yes), it terminates the process when it decides that the accelerator pedal is stepped on (No).

In step 7, the idling reduction control unit 510 reads therein the output signal of the rotational speed sensor 400 and decides whether or not the engine rotational speed Ne is in a predetermined range. Here, the predetermined range is a threshold value adapted for deciding whether or not the diesel engine 100 is stably idling and can be set as a range that it never takes, for example, in warming-up. Then, while the idling, reduction control unit 510 makes the process proceeds to step 8 when it decides that the engine rotational speed Ne is within the predetermined range (Yes), it terminates the process when it decides that the engine rotational speed Ne deviates from the predetermined, range (No).

In step 8, the idling reduction control unit 510 reads therein the output signal of the stroke sensor 410 and decides whether or not the friction clutch 200 is disconnected, for example, by comparing the stroke L with a third predetermined value. Here, the third predetermined value can be appropriately set, for example, by taking the operating characteristics of the friction clutch 200 into consideration. Then, while the idling reduction control unit 510 makes the process proceed to step 9 when it decides that the friction clutch 200 is disconnected (Yes), it terminates the process when it decides that the friction clutch 200 is not disconnected (No). Incidentally, when the vehicle has stopped, the automatic transmission control unit 500 disconnects the friction clutch 200.

In step 9, the idling reduction control unit 510 reads therein the output signal of the second opening sensor 460 and decides whether or not the service brake is being actuated, for example, via whether or not the opening $\theta_B$ of the brake pedal is larger than 0. Then, while the idling reduction control unit 510 makes the process proceed to step 10 when it decides that the service brake is being actuated (Yes), it makes the process proceed to step 13 when it decides that the service brake is not being actuated (No).

In step 10, the idling reduction control unit 510 reads therein the output signal of the position sensor 420 and decides whether or not the transmission 300 is shifted to the ahead stage, via whether or not the gear shift stage POS indicates the ahead stage. Then, while the idling reduction control unit 510 makes the process proceed to step 11 when it decides that the transmission 300 is shifted to the ahead stage (Yes), it terminates the process when it decides that the transmission 300 is not shifted to the ahead stage (No).

In step 11, the idling reduction control unit 510 transmits the engine stop command to the engine control unit 520 and thereby causes it to stop the diesel engine 100.

In step 12, the idling reduction control unit 510 writes S (a halted state) into a variable Mode ensured in the volatile memory 510C in order to store the condition that has stopped the diesel engine 100.

In step 13, the idling reduction control unit 510 reads therein the output signal of the position sensor 420 and decides whether or not the transmission 300 is shifted into neutral, via whether or not the gear shift stage POS indicates the neural. Then, while the idling reduction control unit 510 makes the process proceed to step 14 when it decides that the transmission 300 is shifted into neutral (Yes), it terminates the process when it decides that the transmission 300 is not shifted into neutral (No).

In step 14, the idling reduction control unit 510 reads therein the output signal of the parking brake switch 480 and decides whether or not the parking brake is being actuated, via whether or not it is turned ON. Then, while the idling reduction control unit 510 makes the process proceed to step 15 when it decides that the parking brake is being actuated (Yes), it terminates the process when it decides that the parking brake is not being actuated (No).

In step 15, the idling reduction control unit 510 transmits the engine stop command to the engine control unit 520 and thereby causes it to stop the diesel engine 100.

In step 16, the idling reduction control unit 510 writes P (a parking state) into the variable Mode ensured in the volatile memory 510C in order to store the condition that has stopped the diesel engine 100.

According to such an engine stopping process, when a predetermined engine stop condition is established when the driver of the vehicle or others turns the main switch 470 ON, the diesel engine 100 is automatically stopped. Therefore, the intention of the driver of the vehicle or others is reflected and, for example, in a case where the driver of the vehicle does not desire the idling reduction, that the diesel engine 100 is automatically stopped can be suppressed.

In addition, the idling reduction is executed when the battery voltage VB is equal to or larger than the predetermined voltage Vth, the idling reduction system is normal, and the vehicle speed has been increased beyond the first predetermined value from engine start. Therefore, engine stop in a state where there is a possibility that restart of the diesel engine 100 cannot be performed and engine stop immediately after engine start by the ignition switch can be avoided.

Then, when either of two engine stop conditions as follows has been established on the assumption that the accelerator pedal is not stepped on, the engine rotational speed is within the predetermined range, and the friction clutch 200 is disconnected, the diesel engine 100 is automatically stopped. That is, when the service brake is actuated and the transmission 300 is shifted to the ahead stage at the time of stopping the vehicle, for example, it is decided as the "halted state" that the vehicle has temporarily stopped with the traffic signal and the diesel engine 100 is automatically stopped. In addition, when the service brake is released, the transmission 300 is shifted into neutral, and the parking brake is being actuated at the time of stopping the vehicle, for example, it is decided as the "parking state" that the vehicle stops for a long period of time and the diesel engine 100 is automatically stopped. Here, the "parking state" and the "halted state" are respectively given as examples of the first condition and the second condition.

Therefore, the diesel engine 100 is automatically stopped and further fuel efficiency can be promoted in various scenes by applying the two conditions of the "halted state" and the "parking state" as the conditions under which the idling reduction is executed.

Figure 5:
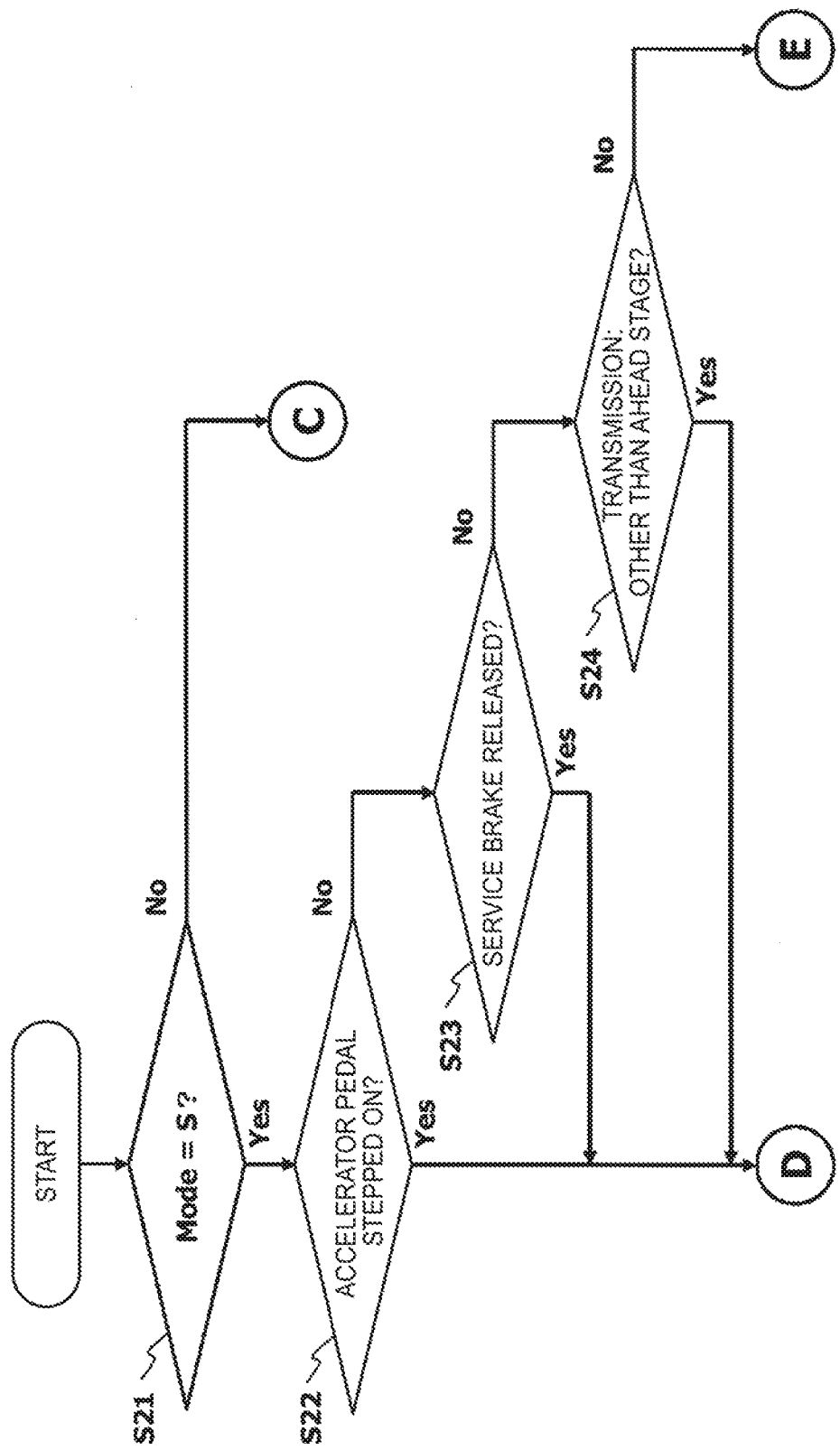
FIG. 5 is a flowchart illustrating one example of an engine restarting process.
Figure 6:
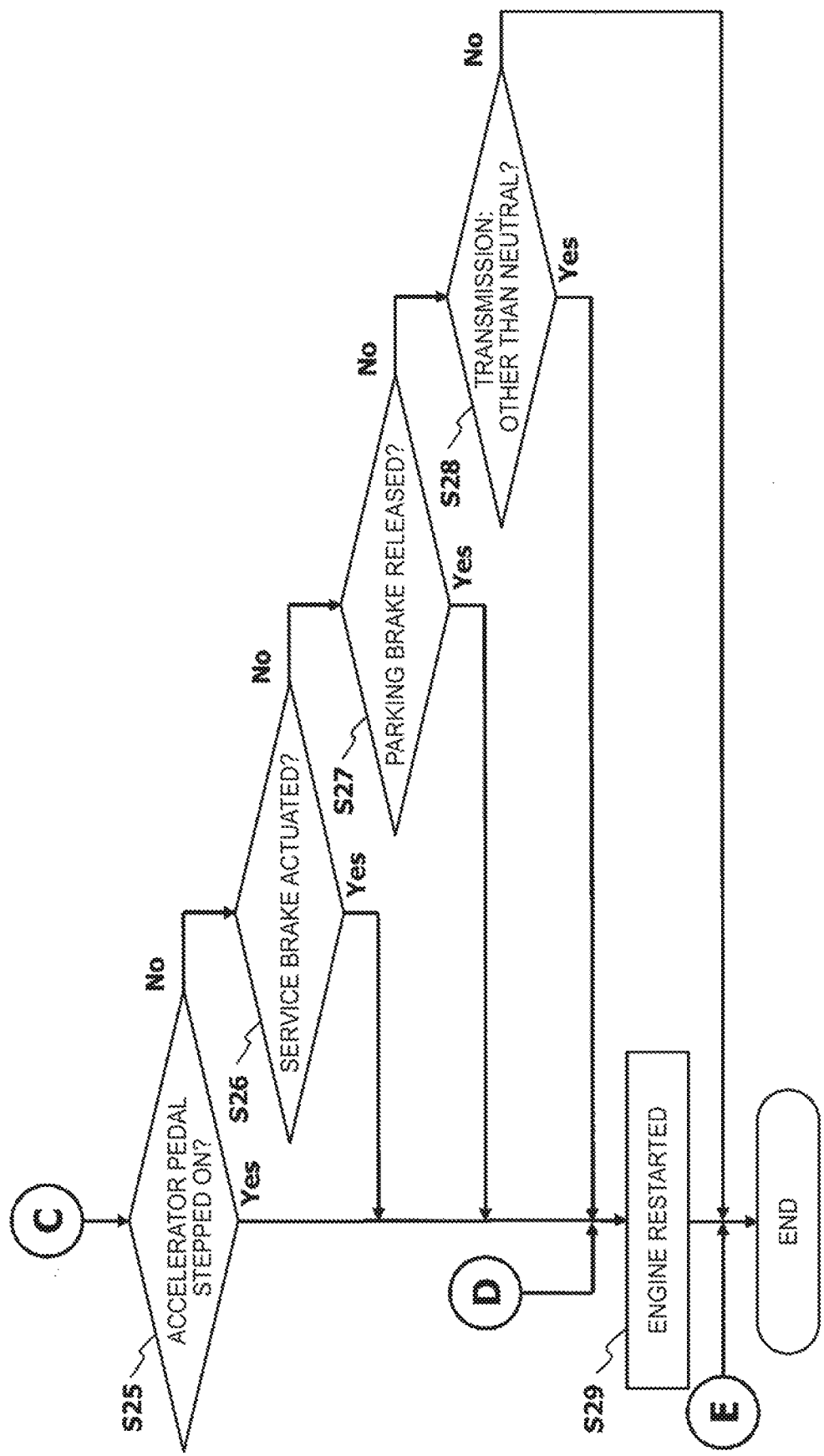
FIG. 6 is a flowchart illustrating one example of the engine restarting process.

FIG. 5 and FIG. 6 illustrate one example of an engine restarting process that the idling reduction control unit 510 repetitively executes at intervals of a predetermined time $t_2$, with that the diesel engine 100 has automatically stopped by the engine stopping process as a trigger. Incidentally, the predetermined time $t_2$ may be the same as the predetermined time $t_1$ in the engine stopping process and may be different from the predetermined time $t_1$ (the same shall apply hereinafter).

In step 21, the idling reduction control unit 510 refers to the variable Mode of the volatile memory 510C and decides whether or not the variable Mode is S (the halted state), in short, whether or not the diesel engine 100 has been stopped because the vehicle has entered the halted state. Then, while the idling reduction control unit 510 makes the process proceed to step 22 when it decides that the variable Mode is S (Yes), it makes the process proceed to step 25 when it decides that the variable Mode is not S (No).

In step 22, the idling reduction control unit 510 reads therein the output signal of the first opening sensor 450 and decides whether or not the accelerator pedal has been stepped on, for example, via whether or not the opening $\theta_A$ of the accelerator pedal is larger than 0. Then, while the idling reduction control unit 510 makes the process proceed to step 29 when it decides that the accelerator pedal has been stepped on (Yes), it makes the process proceed to step 23 when it decides that the accelerator pedal is not stepped on (No).

In step 23, the idling reduction control unit 510 reads therein the output signal of the second opening sensor 460 and decides whether or not the service brake has been released, for example, via whether or not the opening $\theta_B$ of the brake pedal is 0. Then, while the idling reduction control unit 510 makes the process proceed to step 29 when it decides that the service brake has been released (Yes), it makes the process proceed to step 24 when it decides that the service brake is not released (No).

In step 24, the idling reduction control unit 510 reads therein the output signal of the position sensor 420 and decides whether or not the transmission 300 has been shifted to the one other than the ahead stage, via whether the gear shift stage POS indicates neutral or an astern stage. Then, while the idling reduction control unit 510 makes the process proceed to step 29 when it decides that the transmission 300 has been shifted to the one other than the ahead stage (Yes), it terminates the process when it decides that the transmission 300 still stays at the ahead stage (No).

In step 25, the idling reduction control unit 510 reads therein the output signal of the first opening sensor 450 and decides whether or not the accelerator pedal has been stepped on, for example, via whether or not the opening $\theta_A$ of the accelerator pedal is larger than 0. Then, while the idling reduction control unit 510 makes the process proceed to step 29 when it decides that the accelerator pedal has been stepped on (Yes), it makes the process proceed to step 26 when it decides that the accelerator pedal is not stepped on (No).

In step 26, the idling reduction control unit 510 reads therein the output signal of the second opening sensor 460 and decides whether or not the service brake has been actuated, for example, via whether or not the opening $\theta_B$ of the brake pedal is larger than 0. Then, while the idling reduction control unit 510 makes the process proceed to step 29 when it decides that the service brake has been actuated (Yes), it makes the process proceed to step 27 when it decides that the service brake is not actuated (No).

In step 27, the idling reduction control unit 510 reads therein the output signal of the parking brake switch 480 and decides whether or not the parking brake has been released, via whether or not it stays OFF. Then, while the idling, reduction control unit 510 makes the process proceed to step 29 when it decides that the parking brake has been released (Yes), it makes the process proceed to step 28 when it decides that the parking brake is not released (No).

In step 28, the idling reduction control unit 510 reads therein the output signal of the position sensor 420 and decides whether or not the transmission 300 has been shifted to the one other than neutral, via whether the gear shift stage POS indicates the ahead stage or the astern stage. Then, while the idling reduction control unit 510 makes the process proceed to step 29 when it decides that the transmission 300 has been shifted to the one other than neutral (Yes), it terminates the process when it decides that the transmission 300 still stays neutral (No).

In step 29, the idling reduction control unit 510 transmits the engine start command to the engine control unit 520 and thereby restarts the diesel engine 100.

According to such an engine restarting process, the variable Mode of the volatile memory 510C is referred to, and it is specified whether or not the diesel engine 100 has been automatically stopped in either of the "halted state" and the "parking state". Then, in a case where the diesel engine 100 has been stopped in the "halted state", when the accelerator pedal is stepped on, the service brake is released, or the transmission 300 is shifted to the one other than the ahead stage, the diesel engine 100 is restarted. On the other hand, in a case where the diesel engine 100 has been stopped in the "parking state", when the accelerator pedal is stepped on, the service brake is actuated, the parking brake is released, or the transmission 300 is shifted to the one other than neutral, the diesel engine 100 is restarted. That is, when an operation of moving the vehicle has been executed irrespective of either the "halted state" or the "parking state", the diesel engine 100 is automatically restarted.

At this time, since the "halted state" and the "parking state" are mutually different in condition for restarting the diesel engine 100, an uncomfortable feeling of the vehicle driver and others can be reduced.

Incidentally, after the vehicle has entered the halted state or the parking state, that state is not always maintained until the diesel engine 100 is restarted. For example, in a case where the vehicle enters the parking state, the vehicle enters the halted state that it is temporarily stopped and, thereafter a predetermined operation is performed and it shifts to the parking state. Accordingly, it is good to dynamically change the condition under which the diesel engine 100 has been stopped as follows.

Figure 7:
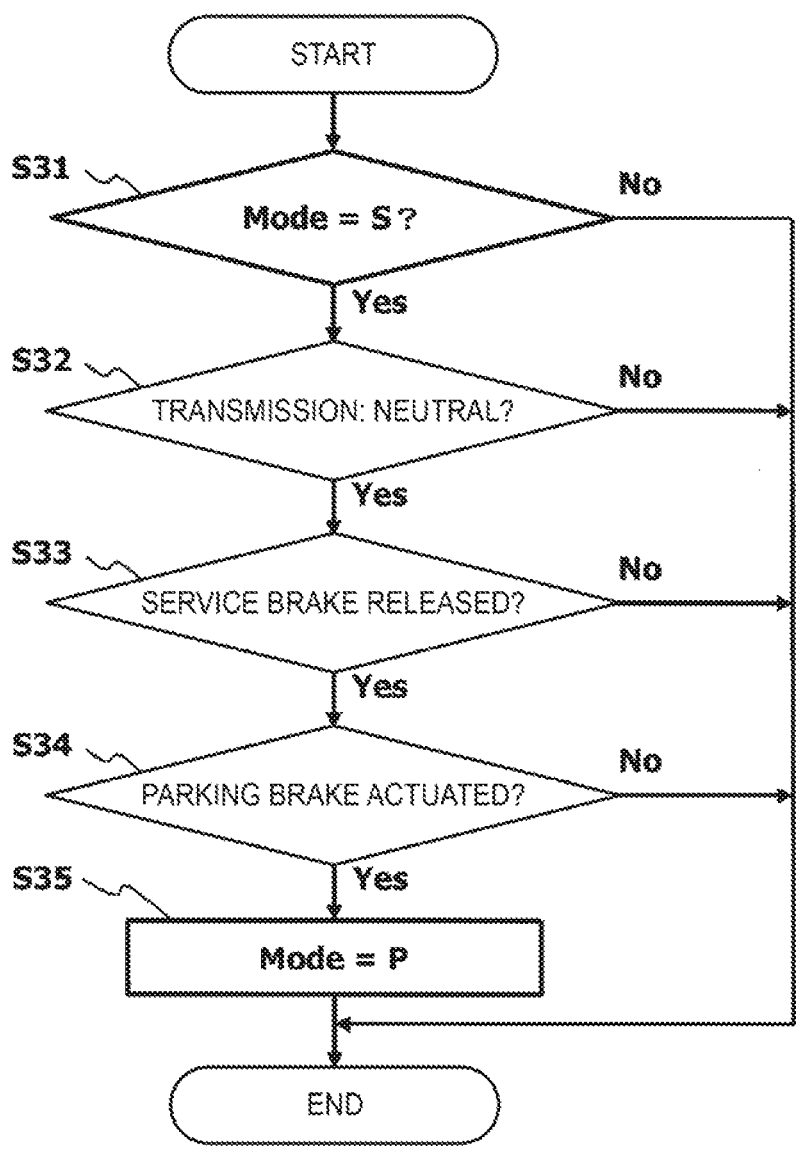
FIG. 7 is a flowchart illustrating one example of a first mode changing process.

FIG. 7 illustrates one example of a first mode changing process that the idling reduction control unit. 510 repetitively executes at intervals of a predetermined time $t_3$, with that the diesel engine 100 has automatically stopped by the engine stopping process as a trigger.

In step 31, the idling reduction control unit 510 refers to the variable Mode of the volatile memory 510C and decides whether or not the variable Mode is S (the halted state). Then, while the idling reduction control unit 510 makes the process proceed to step 32 when it decides that the variable Mode is S (Yes), it terminates the process when it decides that the variable Mode is not S (No).

In step 32, the idling reduction control unit 510 reads therein the output signal of the position sensor 420 and decides whether or not the transmission 300 has been shifted into neutral, via whether or not the gear shift stage POS indicates the neutral. Then, while the idling reduction control unit 510 makes the process proceed to step 33 when it decides that the transmission 300 has been shifted into neutral (Yes), it terminates the process when it decides that the transmission 300 is not shifted into neutral (No).

In step 33, the idling reduction control unit 510 reads therein the output signal of the second opening sensor 460 and decides whether or not the service brake has been released, for example, via whether or not the opening $\theta_B$ of the brake pedal has been reduced to 0. Then, white the idling reduction control unit 510 makes the process proceed to step 34 when it decides that the service brake has been released (Yes), it terminates the process when it decides that the service brake is not released (No).

In step 34, the idling reduction control unit 510 reads therein the output signal of the parking brake switch 480 and decides whether or not the parking brake has been actuated, via whether or not it has been turned ON. Then, while the idling reduction control unit 510 makes the process proceed to step 35 when it decides that the parking brake has been actuated (Yes), it terminates the process when it decides that the parking brake is not actuated (No).

In step 35, the idling reduction control unit 510 writes P (the parking state) into the variable Mode secured in the volatile memory 510C in order to change the condition under which the diesel engine 100 has been stopped from the "halted state" to the "parking state".

According to such a first mode changing process, in a case where the diesel engine 100 has been automatically stopped, with that the vehicle has entered the halted state as a trigger, when the transmission 300 is shifted into neutral, the service brake is released, and the parking brake is actuated, the variable Mode is changed to P (the parking state). Therefore, the condition under which the diesel engine 100 is restarted is changed, and the engine restarting process according to the state of the vehicle can be executed.

Figure 8:
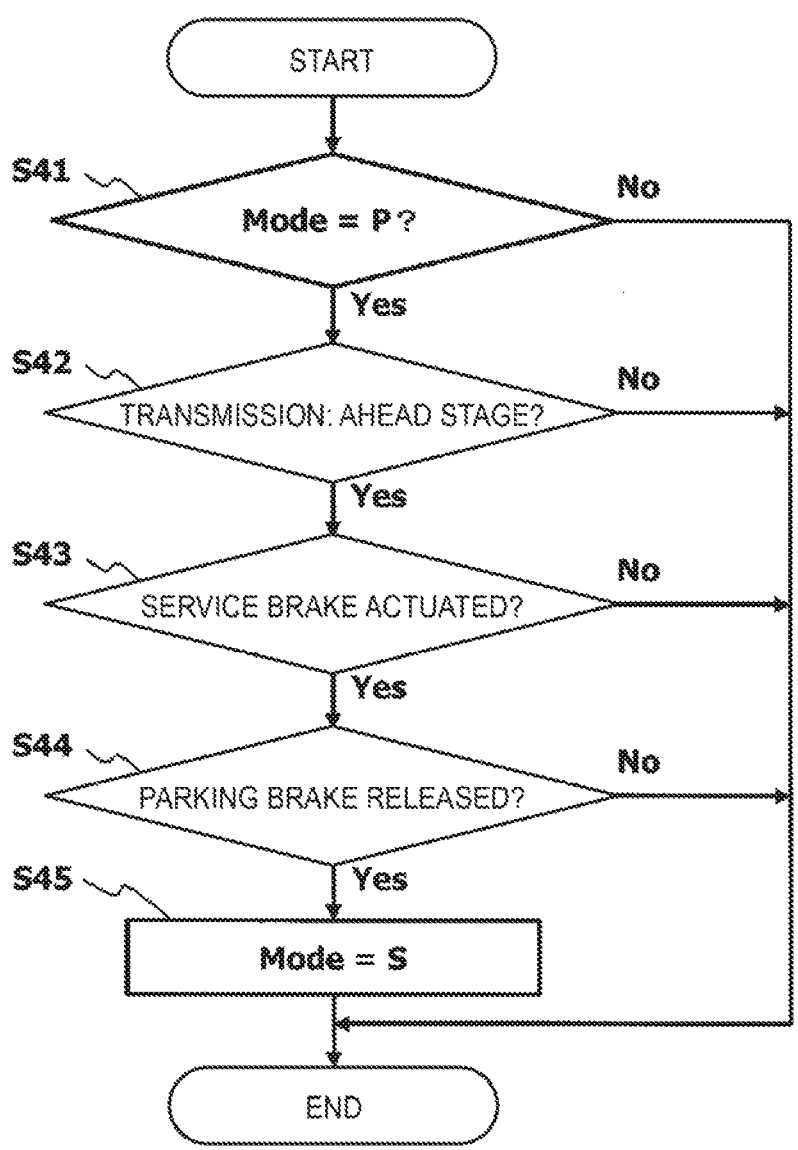
FIG. 8 is a flowchart illustrating one example of a second mode changing process.

FIG. 8 illustrates one example of a second mode changing process that the idling reduction control unit 510 repetitively executes at intervals of a predetermined time $t_4$, with that the diesel engine 100 has been automatically stopped by the engine stopping process as a trigger.

In step 41, the idling reduction control unit 510 refers to the variable Mode of the volatile memory 510C and decides whether or not the variable Mode is P (the parking state). Then, while the idling reduction control unit 510 makes the process proceed to step 42 when it decides that the variable Mode is P (Yes), it terminates the process when it decides that the variable Mode is not P (No).

In step 42, the idling reduction control unit 510 reads therein the output signal of the position sensor 420 and decides whether or not the transmission 300 has been shifted to the ahead stage, via whether or not, the gear shift stage POS indicates the ahead stage. Then, while the idling reduction control unit 510 makes the process proceed to step 43 when it decides that the transmission 300 has been shifted to the ahead stage (Yes), it terminates the process when it decides that the transmission 300 is not shifted to the ahead stage (No).

In step 43, the idling reduction control unit 510 reads therein the output signal of the second opening sensor 460 and decides whether or not the service brake has been actuated, for example, via whether or not the opening $\theta_B$ of the brake pedal is larger than 0. Then, while the idling reduction control unit 510 makes the process proceed to step 44 when it decides that the service brake has been actuated (Yes). It terminates the process when it decides that the service brake is not actuated (No).

In step 44, the idling reduction control unit 510 reads therein the output signal of the parking brake switch 480 and decides whether or not the parking brake has been released, via whether or not it stays OFF. Then, while the idling reduction control unit 510 makes the process proceed to step 45 when it decides that the parking brake has been released (Yes), it terminates the process when it decides that the parking brake is not released (No).

In step 45, the idling reduction control unit 510 writes S the halted state) into the variable Mode secured in the volatile memory 510C, in order to change the condition under which the diesel engine 100 has been stopped from the "parking state" to the "halted state".

According to such a second mode changing process, in a case where the diesel engine 100 has been automatically stopped, with that the vehicle has entered the parking state as a trigger, when the transmission 300 is shifted to the ahead stage, the service brake is actuated, and the parking brake is released, the variable Mode is changed to S the halted state). Therefore, the condition under which the diesel engine 100 is restarted is changed, and the engine restarting process according to the state of the vehicle can be executed.

Here, in the idling reduction system, the various processes and configurations can be changed as follows.

(1) The actuation state of the service brake may be detected also from, for example, whether or not a brake lamp is being lighted, whether or not a pressure of a brake fluid to be supplied to a brake cylinder is equal to or larger than a predetermined pressure and so forth, not limited to the output signal of the second opening sensor 460.

(2) The gear shift state of the transmission 300 may be detected also from, for example, the operation state of a shift lever, and a control state of the transmission 300 by the automatic transmission control unit 500, not limited to the output signal of the position sensor 420.

(3) The idling reduction control unit 510 may be integrally incorporated into the engine control unit 520. In addition, the transmission 300 may be a manual transmission that the driver performs gear shift manually, not limited to the automatic transmission. Further, the engine may be a petrol engine, not limited to the diesel engine.

REFERENCE SYMBOL LIST 100 diesel engine
200 friction clutch
300 transmission
400 rotational speed sensor
410 stroke sensor
420 position sensor
430 vehicle speed sensor
440 voltage sensor
450 first opening sensor
460 second opening sensor
480 parking brake switch
510 idling reduction control unit
510C volatile memory

The invention claimed is:
1. A controller for an engine of a vehicle, comprising:
a sensor that detects an actuation state of a service brake;
a sensor that detects an actuation state of a parking brake;
a sensor that detects a gear shift position of a transmission; and
a control unit that controls an engine according to output signals of the sensors, wherein
the control unit is configured to
stop the engine when the control unit perceives occurrence of a first condition wherein the vehicle is stopped, the service brake is released, the parking brake is actuated, and the gear shift position is a neutral position, and
stop the engine when the control unit perceives occurrence of a second condition wherein the vehicle is stopped by reason other than occurrence of the first condition, the service brake is actuated and the gear shift position is a forward gear position,
wherein the control unit is configured to determine that the engine is stopped in the first condition or the second condition and to change whether the control unit perceives the condition that has stopped the engine as the first condition or the second condition in response to a change in one or more of the actuation state of the service brake, the actuation state of the parking brake and the position of the gear shift, wherein, after determining that the engine has been stopped by establishment of the first condition, the control unit is configured to change what the control unit perceives to be the condition that has stopped the engine to the second condition when the service brake has been actuated, the parking brake has been released, and the gear shift position is a forward gear position, and wherein, after determining that the engine has been stopped by establishment of the second condition, the control unit is configured to change what the control unit perceives to be the condition that has stopped the engine to the first condition when the service brake has been released, the parking brake has been actuated, and the gear shift position is a neutral position.

2. The controller for an engine according to claim 1, further having:

a sensor that detects a voltage of a battery, wherein the control unit forbids stopping of the engine when the voltage of the battery is less than a predetermined voltage.

3. The controller for an engine according to claim 1, further having:

a sensor that detects a vehicle speed, wherein the control unit forbids stopping of the engine when the vehicle speed is not increased beyond a predetermined vehicle speed after the engine has been started by an ignition switch.

4. The controller for an engine according to claim 1, further having:

a sensor that detects an operation state of an accelerator pedal;

a sensor that detects a rotational speed of the engine; and a sensor that detects the actuation state of a clutch, wherein the control unit forbids stopping of the engine when the accelerator pedal is stepped on, when the rotational speed of the engine deviates from a predetermined range, or when the clutch is connected.

5. A control method for an engine of a vehicle, comprising reading via a control unit, a service brake output signal of a service brake sensor relating to an actuation state of a service brake, a parking brake output signal of a parking brake sensor that detects the actuation state of a parking brake, and a gear shift position output signal of a gear shift position sensor that detects a gear shift position of a transmission, stopping the engine when a control unit perceives occurrence of a first condition wherein the vehicle is stopped, the service brake is released, the parking brake is actuated, and the transmission is shifted into neutral has been established, and stopping the engine when the control unit perceives occurrence of a second condition wherein the vehicle is stopped, the service brake is actuated, and the gear shift position is a forward gear position has been established, after determining that the engine is stopped in the first condition or the second condition, changing whether the control unit perceives the condition that has stopped the engine as the first condition or the second condition in response to a change in one or more of the actuation state of the service brake, the actuation state of the parking brake and the position of the gear shift, after determining that the engine has been stopped by establishment of the first condition, changing what the control unit perceives to be the condition that has stopped the engine to the second condition when the service brake has been actuated, the parking brake has been released, and the gear shift position is a forward gear position, and after determining that the engine has been stopped by establishment of the second condition, changing what the control unit perceives to be the condition that has stopped the engine to the first condition when the service brake has been released, the parking brake has been actuated, and the gear shift position is a neutral position.

* * * * *